US008886593B2

(12) United States Patent
Whelan et al.

(10) Patent No.: US 8,886,593 B2
(45) Date of Patent: Nov. 11, 2014

(54) CONTROLLED DISPERSION RATES FOR TRANSFER SWARMS

(75) Inventors: John Staehle Whelan, White Bear Lake, MN (US); Mark Ludwig, Minneapolis, MN (US); Dheiveekan Krishnamurthy, Pune (IN); Pragyaditya Barat, Maharashtra (IN); Ravi Rajagopal, Troy, MI (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 822 days.

(21) Appl. No.: 13/018,523

(22) Filed: Feb. 1, 2011

(65) Prior Publication Data

US 2012/0197838 A1 Aug. 2, 2012

(51) Int. Cl.
*G06F 7/00* (2006.01)
*G06F 17/00* (2006.01)
*G06F 17/30* (2006.01)

(52) U.S. Cl.
CPC .... *G06F 17/3038* (2013.01); *G06F 2213/0038* (2013.01)
USPC .......................................................... 707/609

(58) Field of Classification Search
CPC ................... G06F 17/30286; G06F 17/30067; G06F 3/067; G06F 17/30575; G06Q 10/10
See application file for complete search history.

(56) References Cited

U.S. PATENT DOCUMENTS

| 6,023,737 | A * | 2/2000 | Petersen et al. ................. 710/20 |
| 6,898,639 | B2 | 5/2005 | Muramatsu |
| 6,931,486 | B2 * | 8/2005 | Cavallo et al. ................. 711/114 |
| 7,506,075 | B1 | 3/2009 | Armstrong et al. |
| 7,840,618 | B2 * | 11/2010 | Zhang et al. ................... 707/827 |
| 8,375,396 | B2 * | 2/2013 | Pooni et al. .................... 718/105 |
| 2004/0172491 | A1 * | 9/2004 | Cavallo et al. ................. 710/33 |

(Continued)

FOREIGN PATENT DOCUMENTS

| WO | WO 00/72532 A1 | 11/2000 |
| WO | WO 2005/122532 A1 | 12/2005 |

OTHER PUBLICATIONS

PCT International Search Report dated Jul. 14, 2011 corresponding to PCT Application No. PCT/US2011/032828 filed Apr. 18, 2011 (11 pages).

(Continued)

*Primary Examiner* — Ajay Bhatia
*Assistant Examiner* — Jessica N Le

(57) ABSTRACT

A method for data transfer in a data processing system, and corresponding system and machine-readable medium. One method includes receiving by the data processing system information relating to a data structure to be transferred, where the data structure includes a plurality of elements. Each element in the structure is linked to at least one other element in the structure. The method also includes selecting by the data processing system a group of the plurality of elements, the group including at most a predetermined maximum number of elements. The method further includes transferring by the data processing system the group of elements to a destination. The method also includes assigning by the data processing system the elements of the plurality of elements that are not in the group of elements to one or more substructures. At least one substructure is assigned two or more direct child nodes of transferred nodes. The method further includes recursively performing the steps of selecting, transferring and assigning concurrently on each of the substructures until all elements have been transferred.

14 Claims, 14 Drawing Sheets

(56) References Cited

U.S. PATENT DOCUMENTS

| | | | |
|---|---|---|---|
| 2006/0004807 A1* | 1/2006 | Cruanes et al. | 707/101 |
| 2006/0190925 A1* | 8/2006 | Ishii et al. | 717/106 |
| 2007/0043874 A1 | 2/2007 | Nath et al. | |
| 2007/0162462 A1* | 7/2007 | Zhang et al. | 707/10 |
| 2007/0288484 A1* | 12/2007 | Yan et al. | 707/10 |
| 2009/0006789 A1* | 1/2009 | LaFrese et al. | 711/156 |
| 2009/0019425 A1 | 1/2009 | Archambault et al. | |
| 2009/0022156 A1* | 1/2009 | Blocksome | 370/394 |
| 2009/0182815 A1* | 7/2009 | Czechowski et al. | 709/206 |
| 2009/0222691 A1 | 9/2009 | Riemers | |
| 2009/0271528 A1* | 10/2009 | Gurevich et al. | 709/247 |
| 2009/0287825 A1* | 11/2009 | Walker et al. | 709/226 |
| 2009/0319502 A1* | 12/2009 | Chalouhi et al. | 707/4 |
| 2010/0191774 A1* | 7/2010 | Mason et al. | 707/797 |
| 2011/0016153 A1* | 1/2011 | Atta et al. | 707/797 |
| 2011/0072032 A1 | 3/2011 | Whelan et al. | |
| 2011/0264831 A1* | 10/2011 | Whelan et al. | 710/33 |
| 2012/0026917 A1* | 2/2012 | Guo et al. | 370/254 |
| 2012/0095960 A1* | 4/2012 | Rowley | 707/622 |
| 2012/0303671 A1* | 11/2012 | Chowdhury | 707/797 |

OTHER PUBLICATIONS

Skordoulis, et al. IEEE 802.11 N MAC frame Aggregation Mechanisms for Next-Generation High-Throughput WLANS IEEE Wireless Communications, Feb. 2008 pp. 40-47.

Makineni, et al. Receive Side Coalescing for Accelerating TCP/IP Processing, 2006 Lecture Notes in Computer Science 4297, pp. 289-300, Springer-Verlag Berlin Heidelberg 2006.

PCT International Search Report dated Apr. 5, 2011 corresponding to PCT Application No. PCT/US2010/049650 filed Sep. 21, 2010 (10 pages).

Anonymous; Wikipedia; Retrieved from the Internet: URL: http://en.wikipedia.org/w/index.php?title+BitTorrent—(protocol)&oldid=31516632; Book; 2009 (16 pages).

Wikipedia; Retrieved from the Internet: URL: http://en.wikipedia.org/wiki/Recursion_(computer_science); (1 page).

* cited by examiner

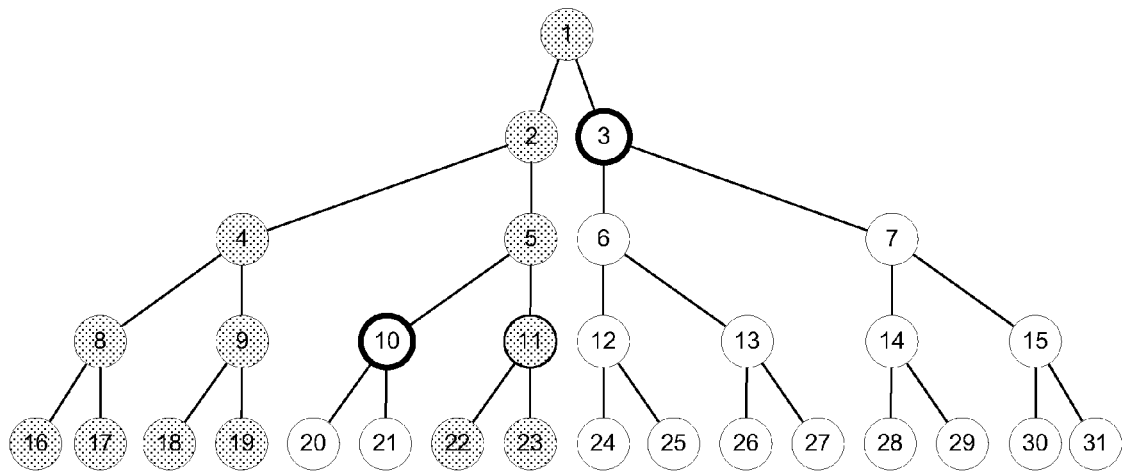
Figure 8A (structure A)
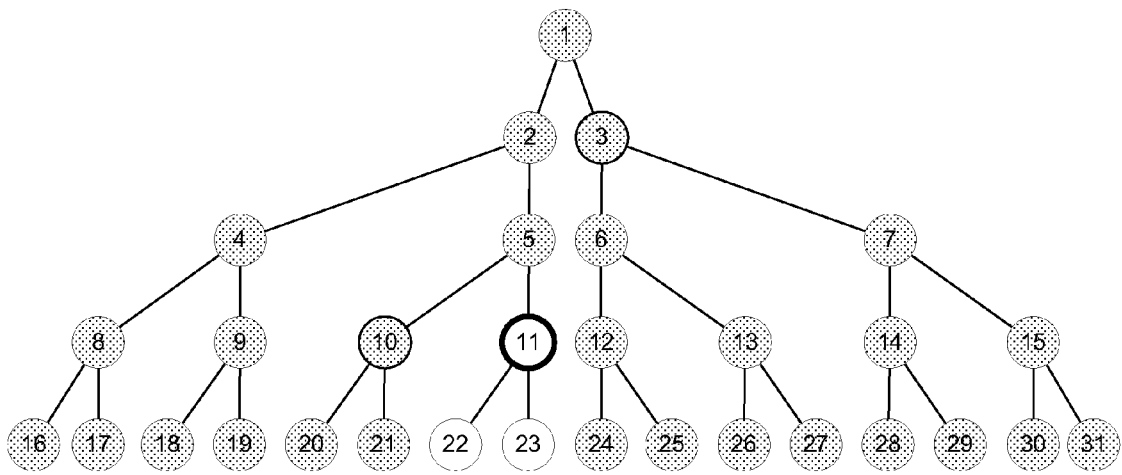
Figure 8B (structure B)

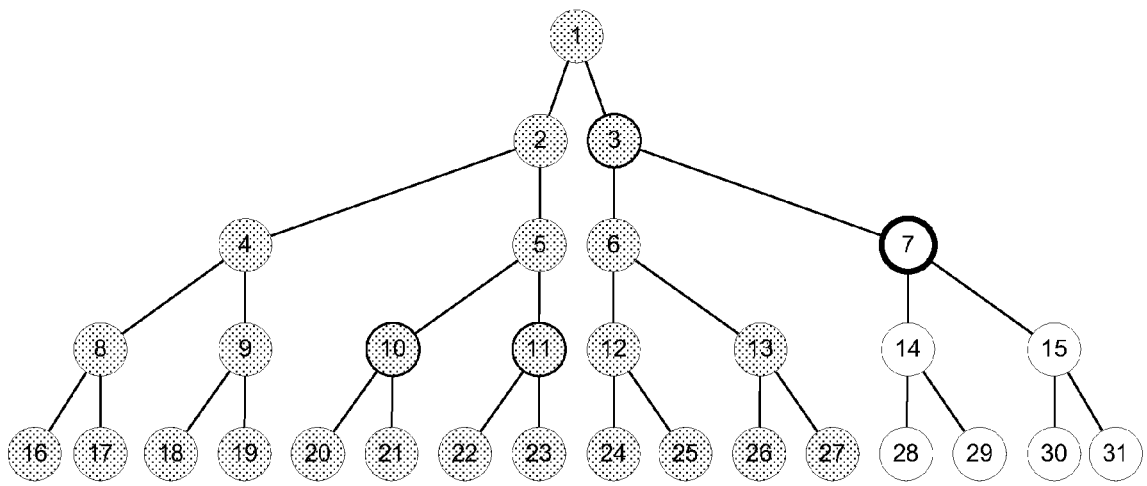
Figure 8C (structure C)
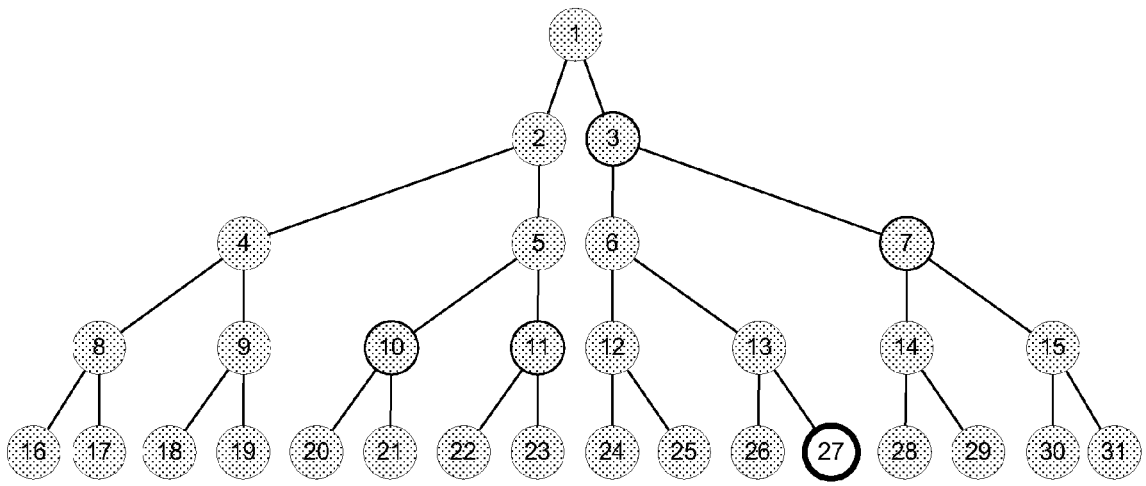
Figure 8D (structure D)

CONTROLLED DISPERSION RATES FOR TRANSFER SWARMS

CROSS-REFERENCE TO OTHER APPLICATIONS

The present application has some subject matter in common with, but is otherwise unrelated to, U.S. patent application Ser. No. 12/563,614, filed Sep. 21, 2009, entitled "SYSTEM AND METHOD FOR TRANSFER OF DATA STRUCTURES WITH TRANSFER STATE AWARENESS", which is hereby incorporated by reference into the present application as it fully set forth herein.

TECHNICAL FIELD

The present disclosure is directed, in general, to data transfer and, more specifically, to efficient transfer of large data structures.

BACKGROUND OF THE DISCLOSURE

Transferring large data structures or large blocks of structured data can be time consuming and act as a bottleneck to efficient data processing.

SUMMARY OF THE DISCLOSURE

A method for data transfer in a data processing system, and corresponding system and machine-readable medium. One method includes receiving by the data processing system information relating to a data structure to be transferred, where the data structure includes a plurality of elements. Each element in the structure is linked to at least one other element in the structure. The method also includes selecting by the data processing system a group of the plurality of elements, the group including at most a predetermined maximum number of elements. The method further includes transferring by the data processing system the group of elements to a destination. The method also includes assigning by the data processing system the elements of the plurality of elements that are not in the group of elements to one or more substructures. At least one substructure is assigned two or more direct child nodes of transferred nodes. The method further includes recursively performing the steps of selecting, transferring and assigning concurrently on each of the substructures until all elements have been transferred.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 8A-8D depict the data structure of FIG. 2 at intermediate stages of operation of the data processing system of FIG. 7.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Swarming allows for transfers of large sets of structured data to be divided into smaller transfers which can be run in parallel. The basic idea is that once a size limit for a transfer is met, the system takes the children of the leaf nodes of the current transfer content, and submits subsequent transfers using those objects as root nodes. While this approach works well for maintaining a limit of the size of each transfer, it can lead to inefficient behavior due to large numbers of sub-optimally small transfers being processed.

Organizations with large quantities of structured data may wish to share data both internally and externally. Often, such sharing of data needs to be accomplished in a specific amount of time. The ability to share data faster may provide a significant business advantages to an organization. Efficiency improvements in transfer operations can provide faster results with the same amount of hardware.

Disclosed embodiments provide a system and method for transferring data between differing processes or applications executing on a single system or on multiple interconnected data processing systems, each having one or more processors.

Figure 1:
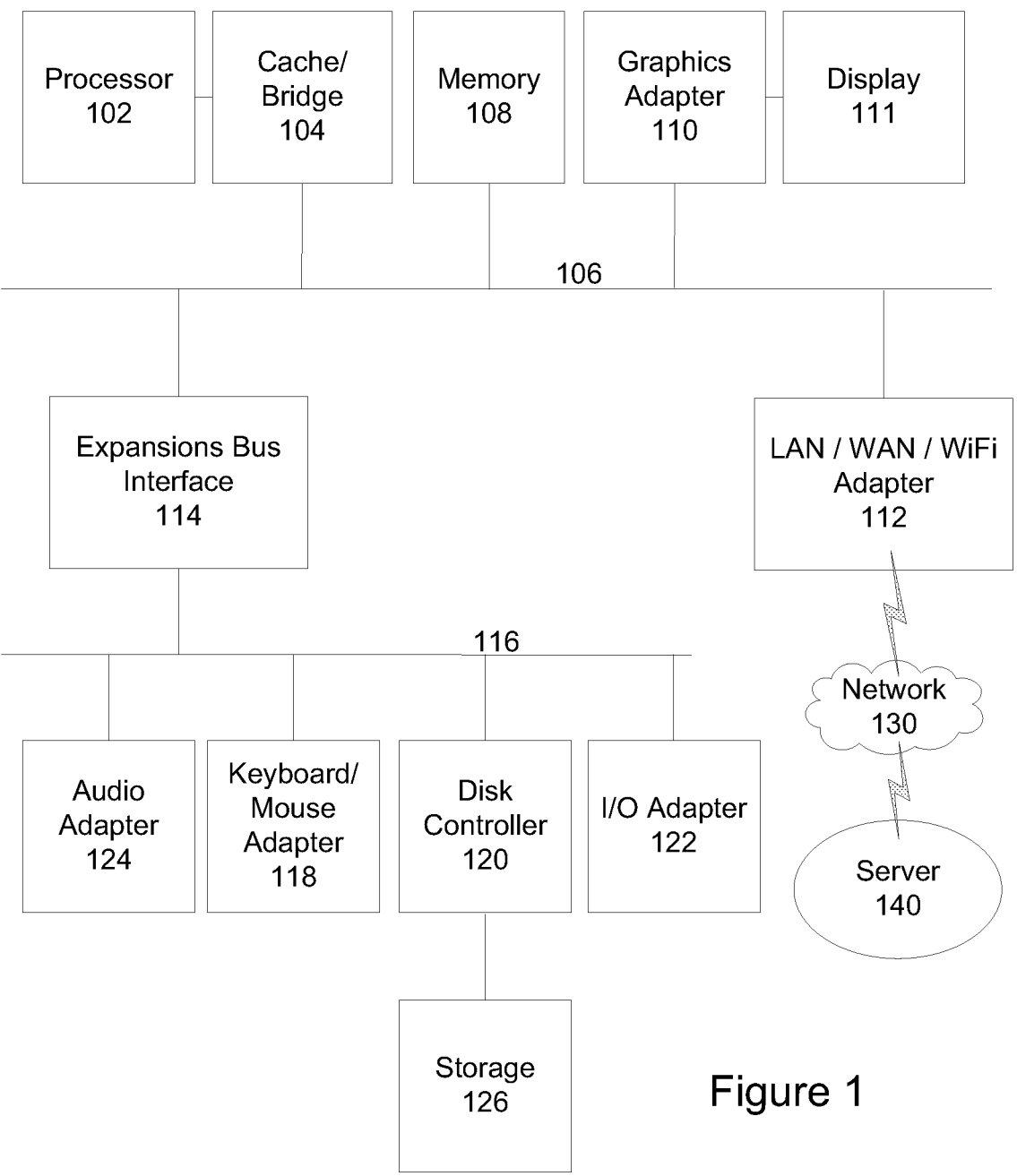
FIG. 1 depicts a block diagram of a data processing system in which an embodiment can be implemented.

FIG. 1 depicts a block diagram of a data processing system in which an embodiment can be implemented, as any of the systems operating on data structures as described herein. The data processing system depicted includes one or more processors such as a processor 102 connected to a level two cache/bridge 104, which is connected in turn to a local system bus 106. Note that although only one processor 102 is shown in this diagram for simplicity, various embodiments explicitly include multiple processors. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100. Various embodiments described herein can include the data transfers between multiple data processing, systems over a network 130, each of the data processing systems implemented as a data processing system 100.

Various embodiments include a system and method for splitting individual transfers of structured data into multiple sub-requests that can run independently in parallel, in order to achieve support of transfer of arbitrary size and in sub-linear time. The disclosed embodiments include adding additional steps to a data transfer. These include analyzing the structure being transferred, and recursively subdividing the structure into transfers of bounded-size subsets of the structure for which non-dependent sub-structures can be transferred in parallel. This approach allows the work to be horizontally scaled across an arbitrary number of processors, and to have transfers completed in logarithmic time (given sufficient processors).

Figure 2:
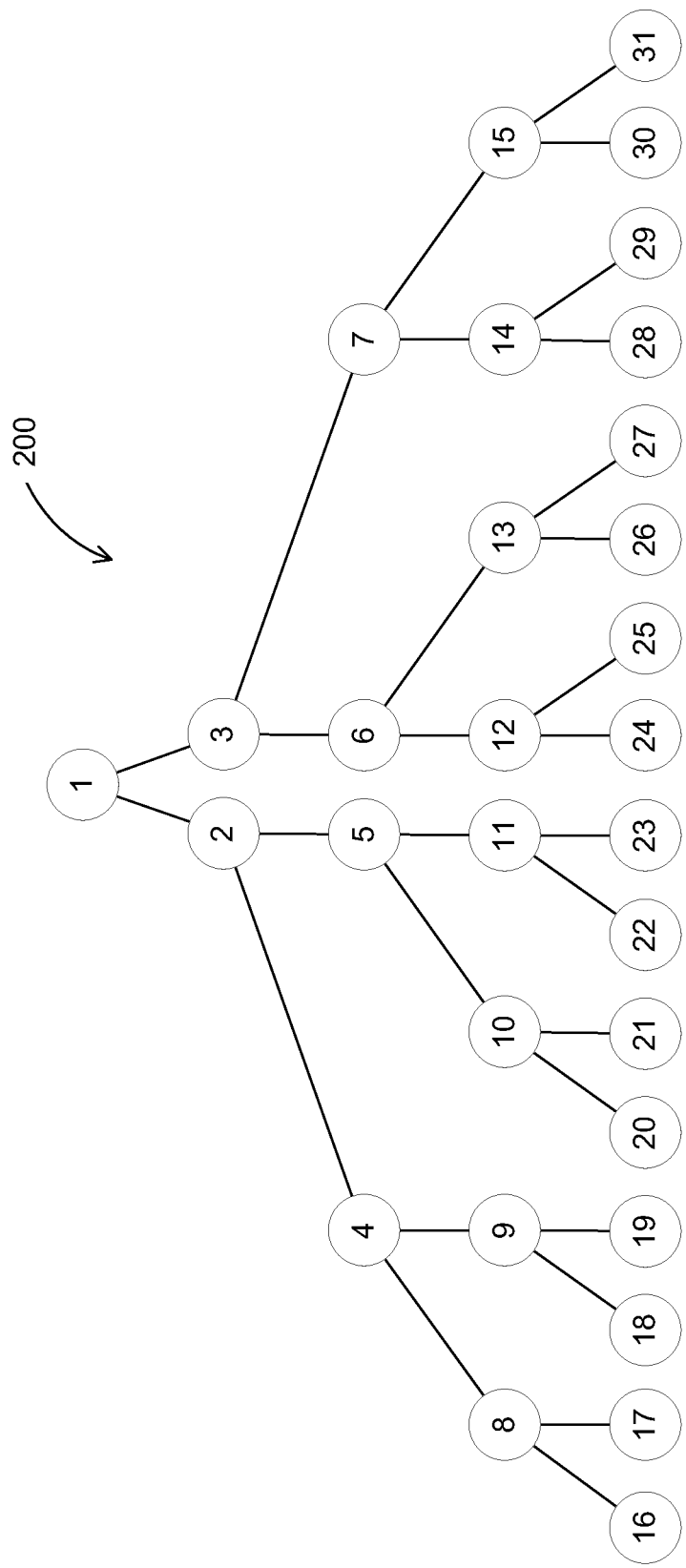
FIG. 2 illustrates a data structure that may be transferred by a data processing system in accordance with disclosed embodiments.

FIG. 2 illustrates an example data structure 200 that will be used to explain embodiments of the disclosure. The data structure 200 is a tree structure. A node 1 has two child nodes: node 2 and node 3. The node 2 has two child nodes (node 4 and node 5) and the node 3 has two child nodes (node 6 and node 7. Each of the nodes 4 through 7 has 2 child nodes: nodes 8 through 15. Each of the nodes 8 through 15 has two child nodes: nodes 16 through 31. The nodes in data structure 200 represent groups of attributes of a logical entity. Common representations of these entities are database records and computer science 'objects'.

The data structure 200 is very regular: each node has two child nodes and each sub-branch extends an equal number of levels (or depth). Such a regular data structure is not typically encountered in a data transfer and is not required for application of methods of the present disclosure. Techniques of the disclosure may be practiced upon data structure having nodes with any number of child nodes and sub-branches of any depth.

The data structure 200 is a tree structure. However, in other embodiments, methods according to the disclosure may be used with any sort of graph data structure—that is, a set of nodes connected by links. By treating only non-transferred nodes directly linked to transferred nodes as root nodes for a child transfer, a graph may be traversed in a way that omits cycles in the graph—i.e., avoids re-transferring previously transferred nodes.

Figure 3:
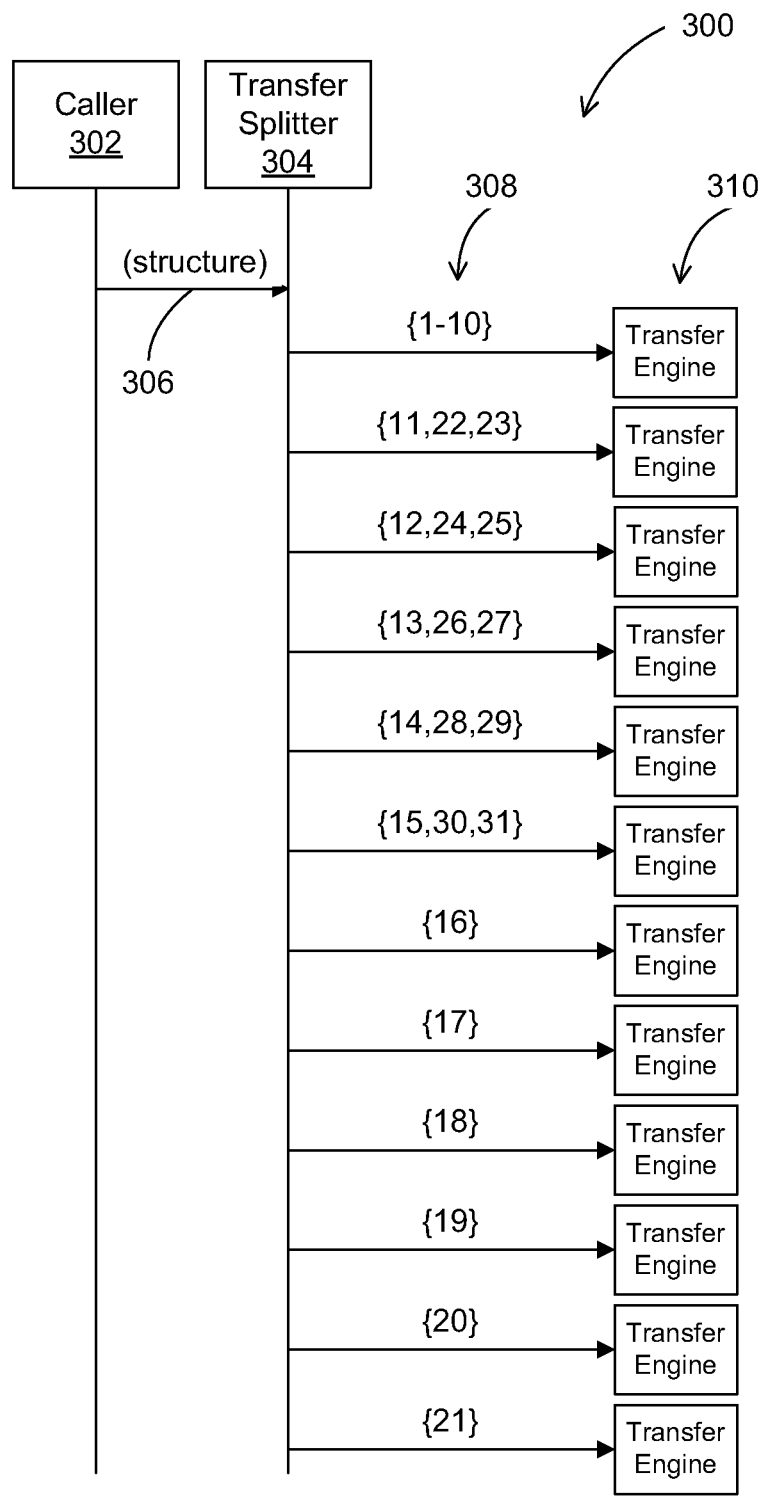
FIG. 3 depicts a first example of a data processing system for transfer of a data structure.

FIG. 3 illustrates a data transfer process as performed by a data processing system 300. Data processing system 300 responds to a data transfer request 306 from caller 302 by invoking a transfer splitter 304 and multiple instances of a transfer engine 310. The data transfer request 306 includes a pointer or other indicator of a data structure to be transferred.

For clarity of explanation, the processes of the disclosure will be described with reference to the data structure 200 of FIG. 2.

The data processing system 300 is configured to transfer the data structure 200 to a destination using a swarming transfer. A swarming transfer includes a 'swarm' or plurality of groups (or 'chunks') of data nodes transferred together. The data processing system 300 is configured to transfer the data structure 200 using a maximum size for any single transfer in the swami of 10 data nodes (also referred to as a 'chunk size' for the transfer).

While the data processing system 300 transfers nodes in chunks of size 10, in other embodiments swarming transfers may be made using chunks of other sizes. Chunk size may be chosen based upon optimizations of performance related to relative chunk sizes. For example, transferring a fewer number of larger chunks has lower fixed costs, since the system has fewer chunks to process. Optimum chunk size is also related to a ratio of concurrent chunks being processed to hardware availability, in that having fewer chunks than an available number of processors typically results in incomplete utilization of resources. Typically, chunk size is chosen to be smaller than a physical limit of a single processor, to avoid system thrashing caused by the processor attempting to transfer a chunk larger than its physical limit. A small chunk size may also be chosen small enough to optimize system utilization—e.g., so that all available processors are used, with no processors remaining idle for extended periods of time. However, chunk size will typically be selected as large as possible while satisfying the first two criteria, in order to minimize the impact of fixed, per-chunk transfer costs.

The transfer splitter 304 splits the data structure 200 into the set of groups or chunks 308. The data structure 200 is traversed in a breadth-first manner, with the result that nodes 1 through 10 are placed into a first chunk before reaching the maximum size for a single chunk. The first chunk is passed to a first transfer engine 310 for transfer to the destination.

The transfer splitter 304 then treats each non-transferred child node of the nodes 1 through 10 as a root node of a separate data structure to be split and transferred. The transfer of nodes 1 through 10 may be referred to as a "parent transfer" and the transfers of the non-transferred child nodes of the nodes 1 through 10 as "child transfers." In the data processing system 300, each child transfer has only a single root node from the non transferred child node of the nodes 1 through 10.

The child transfers in the data processing system 300 include structures rooted at the nodes 11 through 15, each having a chunk size of only three, because the nodes 11 through 15 have only two child nodes each. The child transfers also include structures rooted at the nodes 16 through 21, each having a chunk size of only one, because the nodes 16 through 21 have no child nodes. As a result, the data processing system 300 produces one chunk of size 10, five chunks of size 3, and six chunks of size 1, for an average payload transfer size of only 2.6 nodes per transfer.

Figure 4:
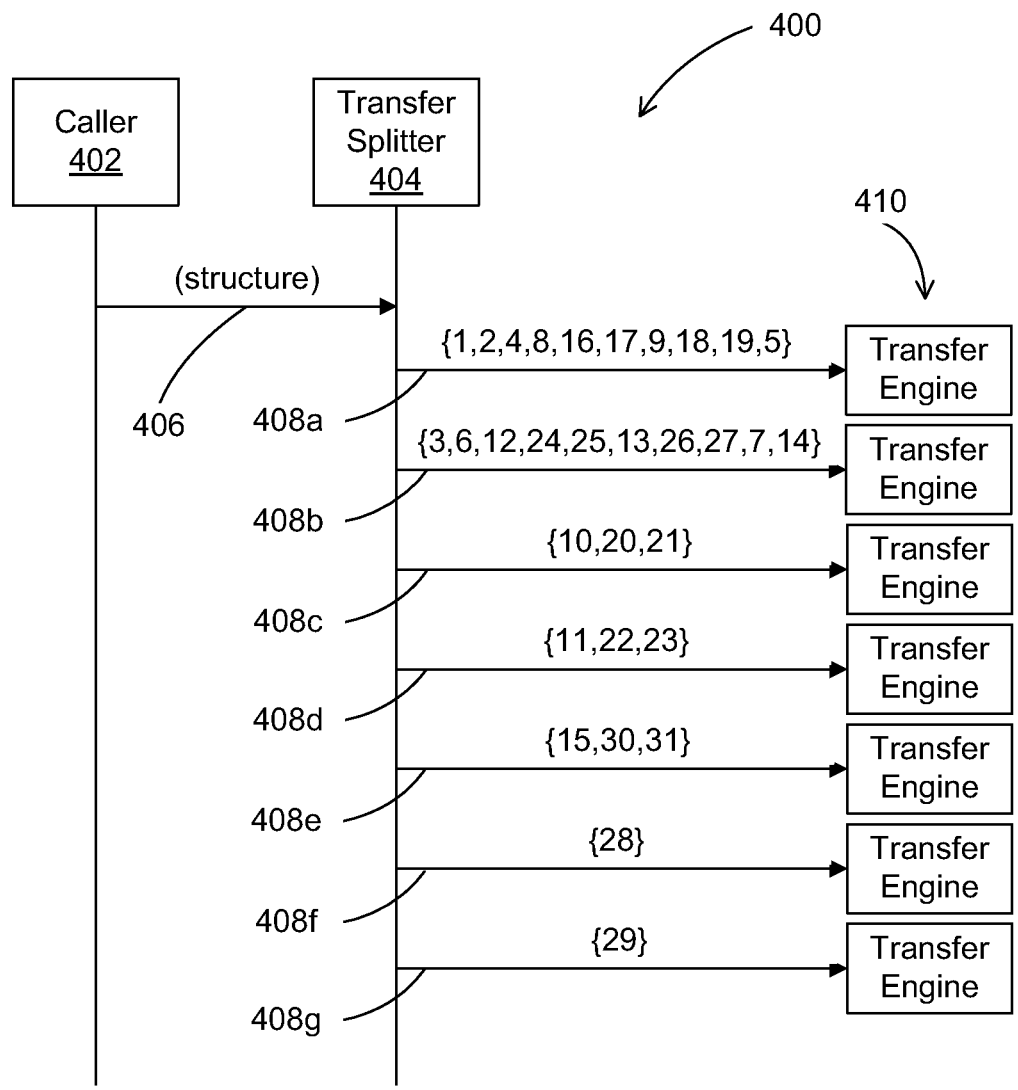
FIG. 4 depicts a second example of a data processing system for transfer of a data structure.

FIG. 4 illustrates a data transfer process as performed by a data processing system 400. Data processing system 400 responds to a data transfer request 406 from caller 402 by invoking a transfer splitter 404 and multiple instances of a transfer engine 410. The data transfer request 406 includes a pointer or other indicator of the data structure 200 to be transferred.

The data processing system 400 is configured to transfer the data structure 200 to a destination in a swarming transfer using a chunk size of 10 data nodes using a depth-first traversal process, producing the set of chunks 408*a-g*. Again, the transfer splitter 404 fills each chunk until the maximum chunk size is obtained or no further nodes remain in the structure being traversed. Once a chunk is completed, any non-transferred child nodes of the nodes in the chunk are treated as root nodes of separate data structures to be split and transferred. Each child transfer includes only a single root node from the non-transferred child nodes.

Figure 4A:
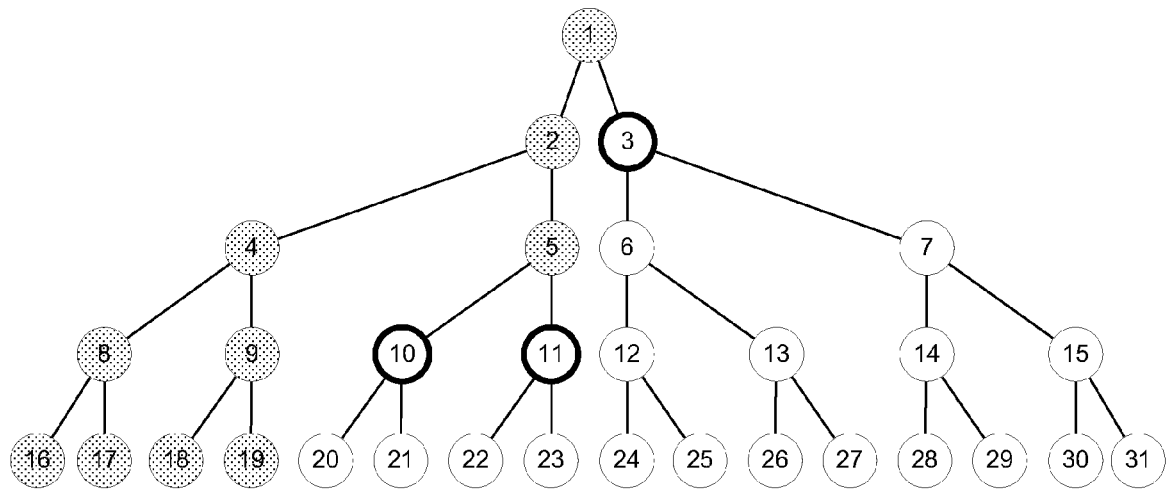
FIGS. 4A-4F depict the data structure of FIG. 2 at intermediate stages of operation of the data processing system of FIG. 4.

The transfer splitter 404 fills the chunk 408*a* by performing a depth-first traversal of the data structure, beginning at node 1. As shown in FIG. 4A, after filling the chunk 408*a*, the non-transferred nodes of the data structure 200 are associated with three substructures having roots at nodes 3, 10 and 11, respectively. Because each child transfer of the data processing system 400 includes only a single root node, the transfer splitter 404 may choose any one of the nodes 3, 10 and 11 to begin filling a second chunk. In the example shown in FIG. 4, the node 3 is chosen and the chunk 408*b* is filled by a depth-first traversal of the substructure rooted at the node 3.

Figure 4B:
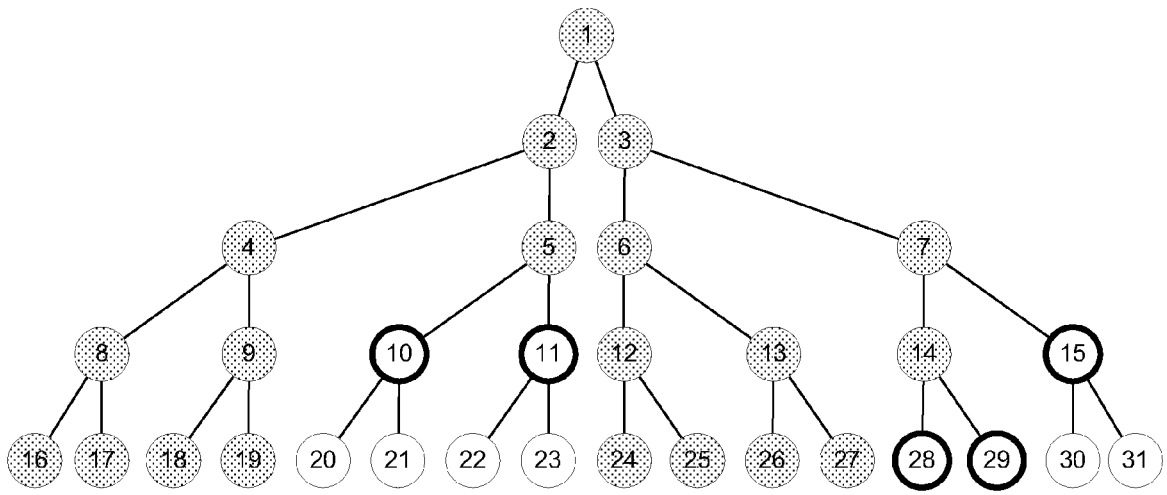
Figure 4C:
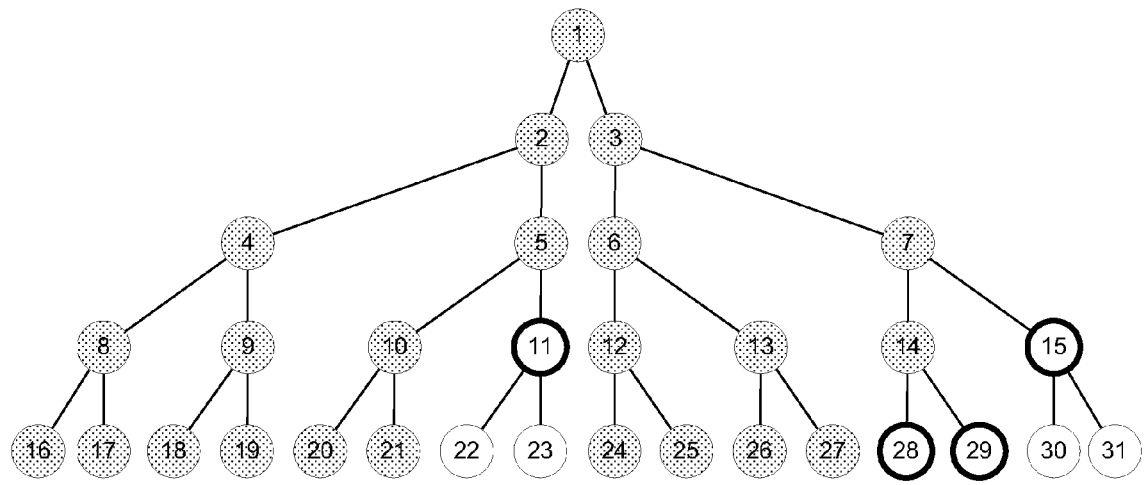
Figure 4D:
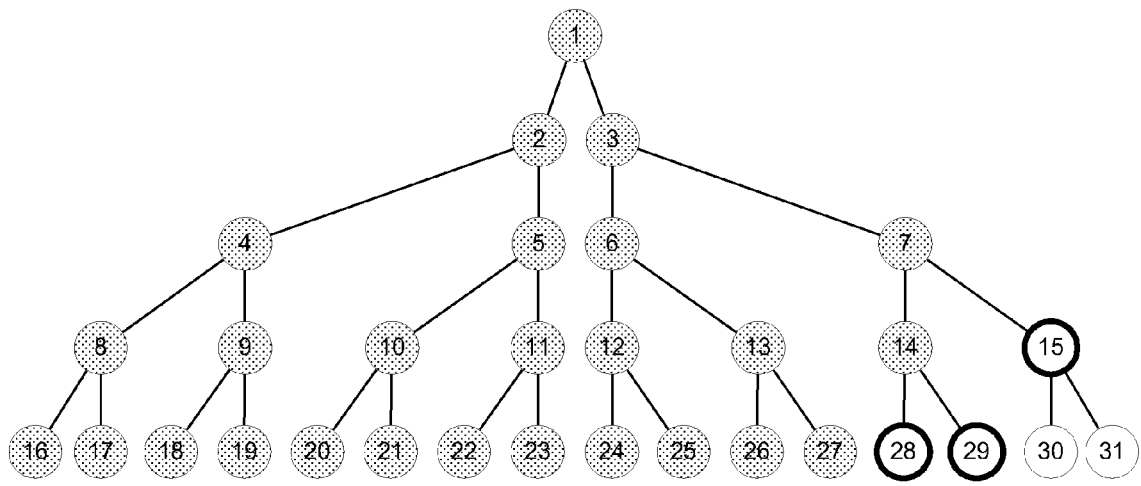
Figure 4E:
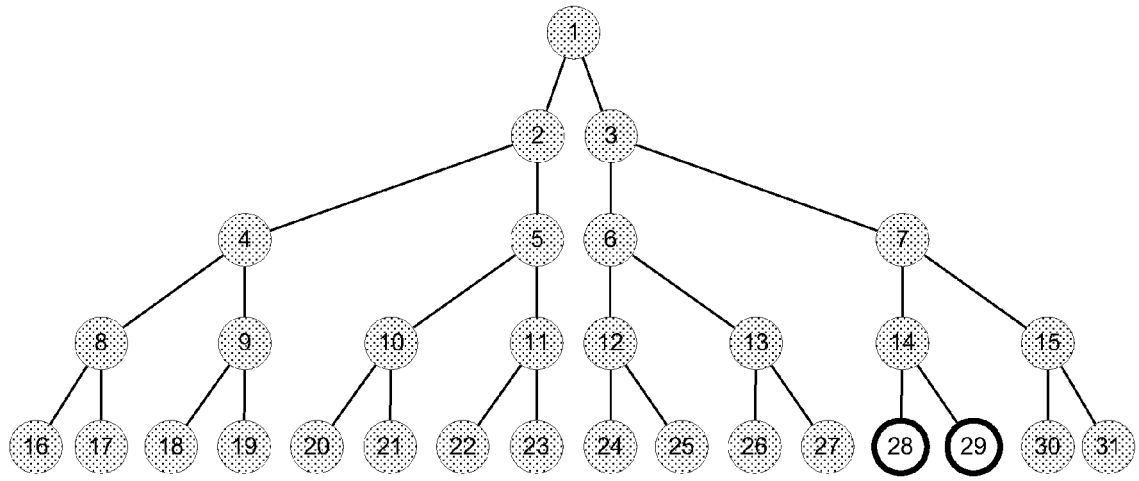
Figure 4F:
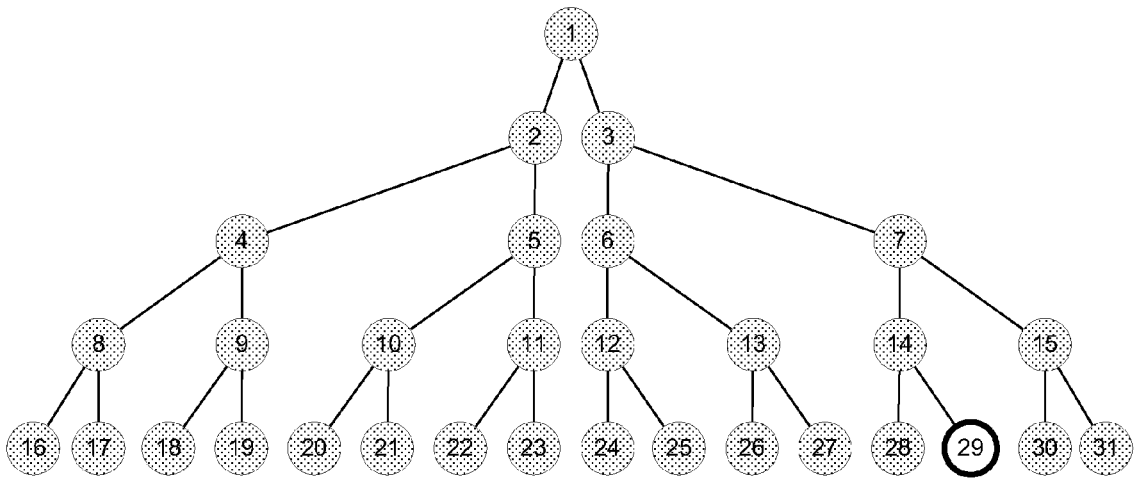

As shown in FIG. 4B, after the chunk 408*b* is filled, substructures remain with roots at 10, 11, 15, 28 and 29. Again, the transfer splitter 404 may choose any one of the root nodes and, in this example, chooses node 10. The chunk 408*c* is complete when nodes 10, 20 and 21 are assigned, because the substructure rooted at the node 10 has been fully traversed. FIG. 4C shows the remaining substructures after the chunk 408*c* is completed, with substructures rooted at the nodes 11, 15, 28 and 29. The transfer splitter chooses the node 11 and produces the chunk 408*d*. FIG. 4D shows the remaining substructures after the chunk 408*d* is completed, with substructures rooted at the nodes 15, 28 and 29. The transfer splitter chooses the node 15 and produces the chunk 408*e*. FIG. 4E shows the remaining substructures after the chunk 408*e* is completed, with substructures rooted at the nodes 28 and 29. The transfer splitter chooses the node 28 and produces the chunk 408*f*. FIG. 4F shows the remaining substructures after the chunk 408*f* is completed, with a single substructure, rooted at the node 29. The transfer splitter chooses the node 29 and produces the chunk 408*g*.

Thus, in data processing system 400 (as in data processing system 300), the transfer splitter 404 traverses each substructure individually and sequentially, starting from the root node of the substructure. Where a substructure has more than ten elements, one or more additional substructures are generated once a chunk has been filled from the elements of the substructure. Pointers or other indicators of each non-traversed substructure are maintained until the transfer splitter 404 has chosen the substructure for traversal. The root node of a substructure selected for traversal may be a child node of a node transferred in a chunk just filled, or may be a child node of a node transferred in a previously filled chunk.

The depth-first traversal of the data processing system 400 produces two chunks of size 10, three chunks of size 3, and two chunks of size 1, for an average payload transfer size of 4.4 nodes per transfer. While better than the results for the data processing system 300, the data processing system 400 still falls short of an optimal number of transfers for the data structure 200. For the 31 nodes of the data structure 200 and a maximum chunk size of 10, an optimum swarm would include three chunks of size 10 and one chunk of size 1, for an average payload transfer size of 7.75 nodes per transfer.

Having large numbers of small transfers is inefficient and the result is a suboptimal data transfer. Modifications in traversal algorithms and changes to chunk sizes do not produce an improvement across all data structures, because some configurations will work better with some data structures and worse with others. In general, this result is seen in all configurations of swarming.

Methods according to the disclosure use swarming to break down transfers which are larger than a transfer size into sub-transfers which are smaller, while avoiding the creation of many small transfers. Such methods provide swarming transfers with reduced requirements for computational overhead and time by controlling the dispersion rate of transfers into child transfers. Methods according to the disclosure allow a child transfer to include multiple root nodes from among the non-transferred child nodes of its parent transfer. Furthermore, after a parent transfer is created, methods according to the disclosure limit a number of child transfers initiated to a selected maximum number. This maximum number may be referred to as a dispersion rate of the method.

In transfer methods that do not operate according to this disclosure, the numbers of children transfers per parent transfer is central to the problem of the generation of large numbers of tiny transfers. For example, with breadth-first traversal and a chunk size of 1000, a structure with an average of two children per node would have roughly 500 leaf nodes, and 1000 child transfers in a method not operating according to this disclosure. (Assuming none of the branches in the parent transfer were completely contained within the parent.) A similar result would occur in a depth-first case; such a method would end up with 1000 sub-transfers.

In general, what is wanted is a way to balance between: (1) the need to limit the size of each individual transfer payload, (2) an ability to avoid generating large numbers of tiny payload transfers, and (3) the need to obtain the horizontal scalability benefits of swarming. A good answer to balancing all of these concerns can be found in methods according to the disclosure that specify a Controlled Dispersion Rate (CDR). The idea behind CDR is, within the chunk size limits specified by swarming, to limit the number of child transfers from a given parent to a number of children that balances the needs of size with the needs of parallelism.

Figure 5:
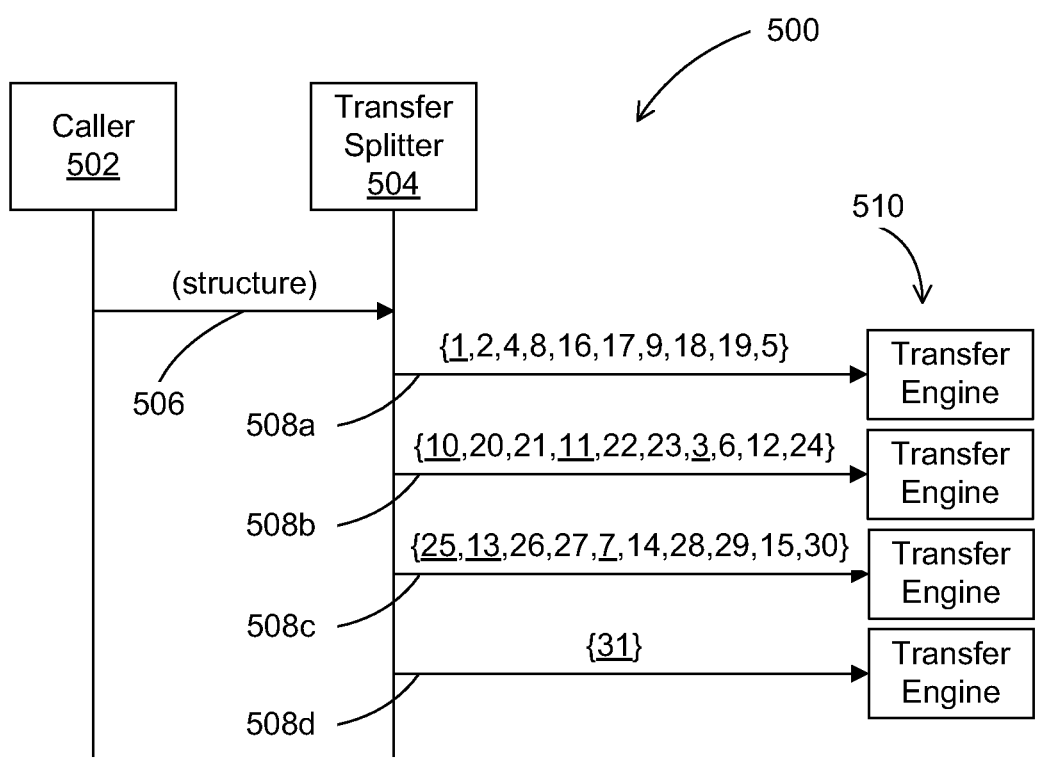
FIG. 5 depicts a first example of a data processing system for transfer of a data structure in accordance with disclosed embodiments.

FIG. 5 illustrates a data transfer process as performed by a data processing system 500 in accordance with disclosed embodiments. As shown here, data processing system 500 responds to a data transfer request 506 from caller 502 by invoking a transfer splitter 504 and multiple instances of a transfer engine 510. The data transfer request 506 includes a pointer or other indicator of a data structure to be transferred. For clarity of disclosure, the data transfer process performed by the data processing system 500 is described with reference to the data structure 200 of FIG. 2.

The data processing system 500 is configured to transfer the data structure 200 to a destination in a swarming transfer using a depth-first traversal process, producing the set of chunks 508a-508d. The data processing system 500 uses a maximum chunk size of 10 and a controlled dispersion rate of one, which means only a single child transfer is initiated after each parent transfer.

Thus, the transfer splitter 504 generates the chunk 508a by selecting a first group of elements from the initial data structure 200 and sends the chunk 508a to a first instantiation of the transfer engine 510 for transfer to a destination. Because the data processing system 500 is configured with a dispersion rate of one, the transfer splitter 504 continues with the generation of only a single child transfer chunk—the chunk 508b.

Figure 6A:
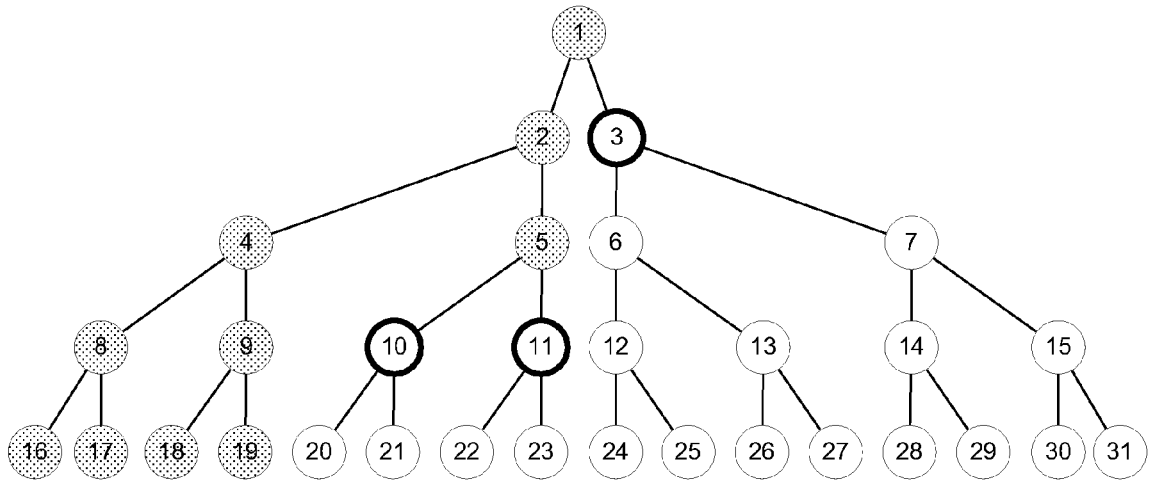
FIGS. 6A-6C depict the data structure of FIG. 2 at intermediate stages of operation of the data processing system of FIG. 5.

As shown in FIG. 6A, after the generation of the chunk 508a, the non-transferred nodes of the data structure 200 (that is, the nodes of the data structure 200 that are not in the chunk 508a) are associated with three substructures having roots at nodes 3, 10 and 11, respectively. The root node 3 is directly linked to (a child node of) the node 1, which is a node in the chunk 508a. The root nodes 10 and 11 are both child nodes (directly linked to) the node 5, which is also in the chunk 508a. Because methods according to the disclosure permit multiple root nodes in a child transfer, the transfer splitter 504 begins generating the chunk 508b by selecting root node 10 and its child nodes 20 and 21. Because the maximum chunk size of 10 has not been reached, the transfer splitter 504 continues generating the chunk 508b by selecting the root node 11 and its child nodes 22 and 23. Again, because there are still not 10 nodes in the chunk 508b, the transfer splitter 504 continues generating the chunk 508b beginning with the root node 3. By depth-first traversal, the nodes 3, 6, 12 and 24 are selected and added before the maximum chunk size of 10 is reached and the chunk 508b is completed. The chunk 508b may then be sent to a second instantiation of the transfer engine 510 for transfer to the destination.

While FIG. 5 illustrates the generation of the chunk 508b selecting the root nodes of the structure of FIG. 6A in the order 10, 11 and 3, it will be understood that in other embodiments the root nodes may be selected in any order. The chunks resulting from such other selection orders would result in transferring the nodes of the structure 200 in other groupings, but it will be understood that such transfers would still proceed according to the present disclosure.

Figure 6B:
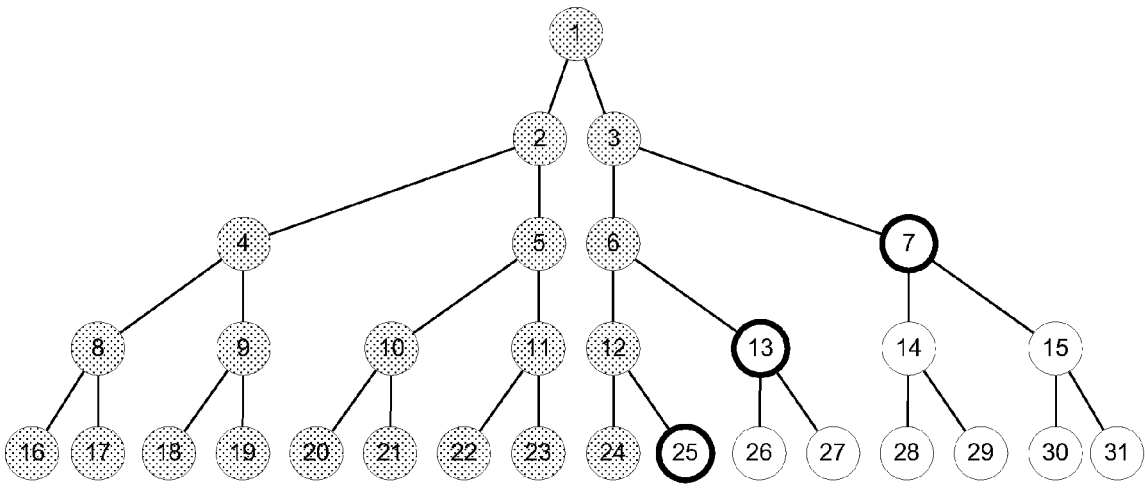

The transfer splitter again continues with the generation of only a single child transfer chunk—the chunk 508c. As shown in FIG. 6B, after the generation of the chunk 508b, the non-transferred nodes of the data structure 200 (in this case, the nodes of the data structure 200 that are not in the chunk 508b) have roots at nodes 7, 13 and 25. The root nodes 7, 13 and 25 are directly linked to the nodes 3, 6 and 12, which are all nodes in the chunk 508b. Thus, the generation of the chunk 508c begins with selecting the node 25, adds the nodes 13, 26 and 27, and continues with the nodes 7, 14, 28, 29, 15 and 30 before reaching the maximum chunk size of 10. The completed chunk 508c may then be sent to a third instantiation of the transfer engine 510 for transfer to the destination. Again, it will be understood that methods according to the disclosure may select the root nodes 7, 13 and 25 in any order to traverse the non-transferred nodes of the data structure 200 shown in FIG. 6B.

Figure 6C:
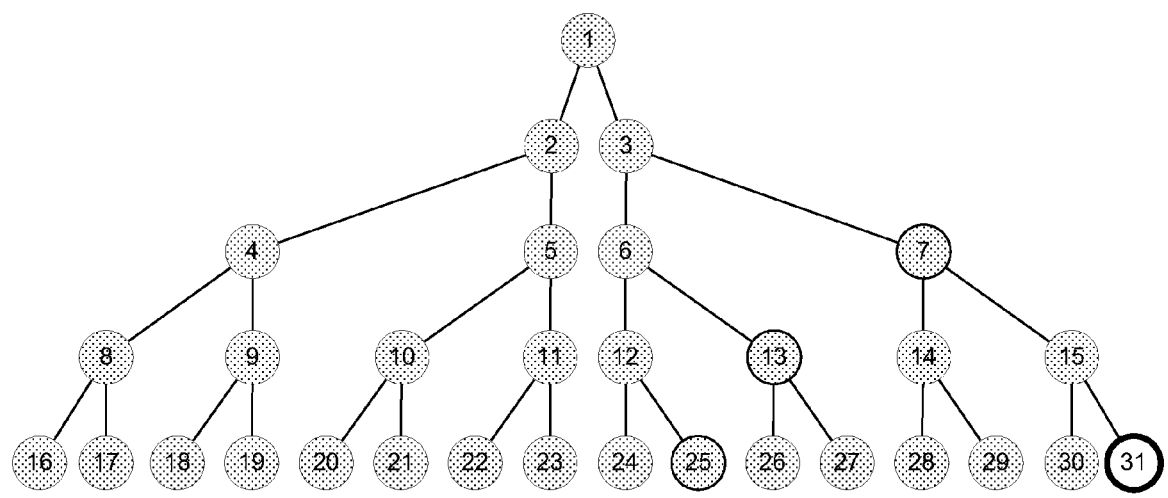

As shown in FIG. 6C, only a single non-transferred node (node 31, a child node of the node 15, which is in the chunk 508c) remains in the data structure 200 after the generation of the chunk 508c. Thus, the transfer splitter 504 selects the node 31 for the chunk 508d and, because the data structure has been completely traversed, sends the chunk 508d to a fourth instantiation of the transfer engine 510 for transfer to the destination and then terminates.

The data processing system 500, utilizing a controlled dispersion rate of one, produces an optimal average payload transfer size—three chunks of size 10 and one chunk of size 1, or an average size of 7.75 objects per chunk. The results for an embodiment utilizing a breadth-first traversal are similar. However, the data processing system 500 has poor parallelization behavior, because only a single child transfer is initiated after each parent transfer. Thus, the chunks 508a-508d are generated by a synchronized (or sequential) traversal of the data, structure 200. While the instantiations of the transfer engine 510 may operate in parallel, the transfer splitter 504 operates sequentially, providing linear performance. That is, the computation time required for the transfer splitter 504 grows linearly with increasing size of the data structure being transferred.

In order to include parallel processing needs into the balance, the controlled dispersion rate of methods according to the disclosure may be increased. When the dispersion rate is larger than one, child traversals and transfers can run in parallel.

Figure 7:
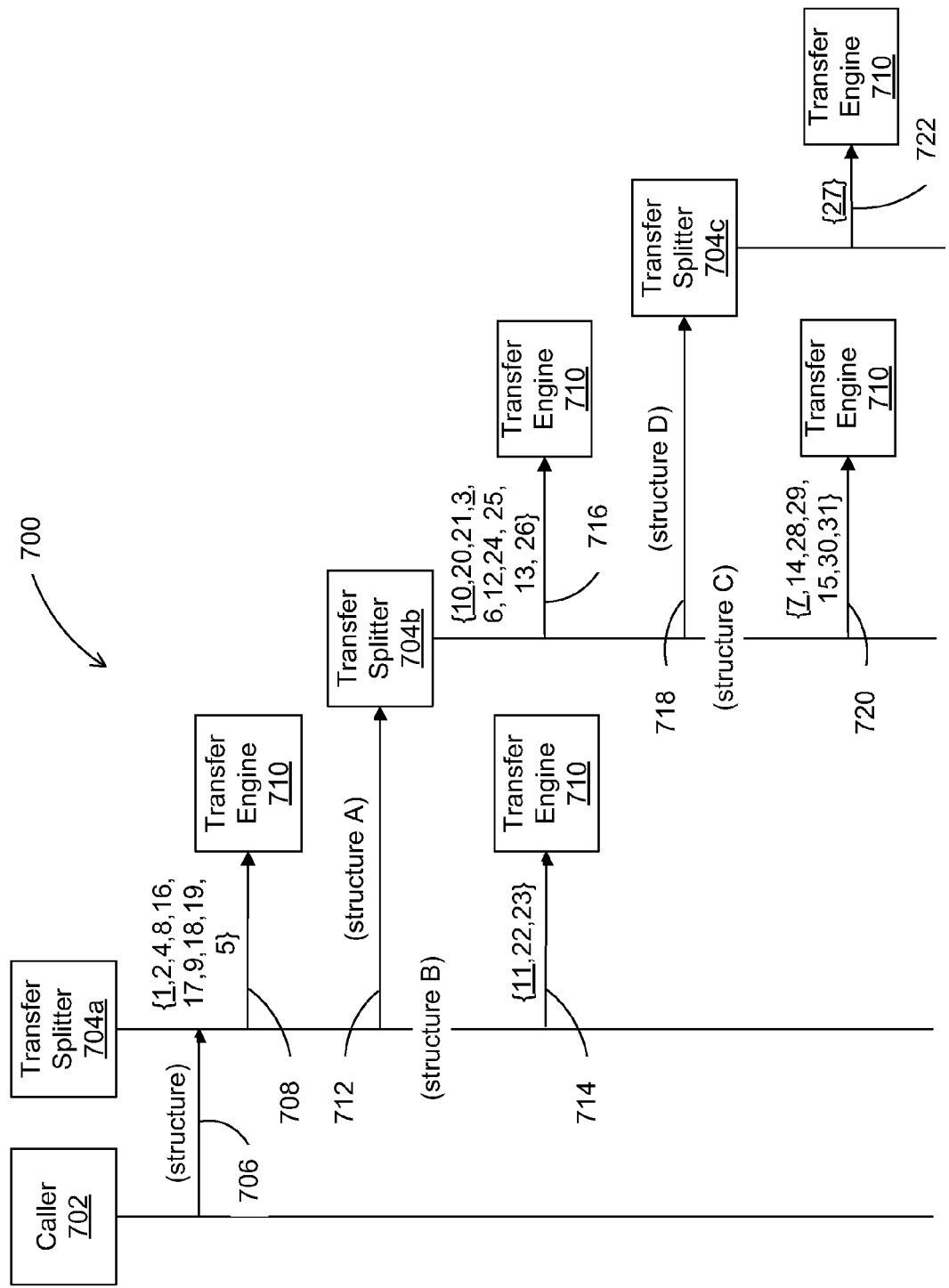
FIG. 7 depicts a second example of a data processing system for transfer of a data structure in accordance with disclosed embodiments.

FIG. 7 illustrates a data transfer process as performed by a data processing system 700 in accordance with disclosed embodiments. As shown here, data processing system 700 responds to a data transfer request 706 from caller 702 by invoking multiple instances of a transfer splitter 704 and multiple instances of a transfer engine 710. The data transfer request 706 includes a pointer or other indicator of a data structure to be transferred. Again, the data transfer process performed by the data processing system 700 is described with reference to the data structure 200 of FIG. 2.

The data processing system 700 is configured to transfer the data structure 200 to a destination in a swarming transfer using a depth-first traversal process, producing the chunks 708, 714, 716, 720 and 722. The data processing system 700 uses a maximum chunk size of 10 and a controlled dispersion rate of two, which means two child transfers are initiated after each parent transfer.

Thus, the transfer splitter 704a generates the chunk 708 by selecting elements from the initial data structure 200 and sends the chunk 708 to a first instantiation of the transfer engine 710 for transfer to a destination. Because the data processing system 700 is configured with a dispersion rate of two, the transfer splitter 704a assigns the non-transferred nodes of the data structure 200 (that is, the nodes of the data structure 200 that are not in the chunk 708) to two substructures (structure A and structure B, to be explained in greater detail below with reference to FIGS. 8A and 8B). The transfer splitter 704a then invokes a transfer splitter 704b with the structure B. The transfer splitter 704a continues its own processing with the structure A.

The transfer splitters 704a and 704b proceed to process their individual structures concurrently—that is, in parallel. Furthermore, the transfer splitters 704a and 704b process their structures independently of each other—that is, without reference to (or knowledge of) the other's structure and without recombining the structures at a later stage of processing.

Because order of child transfer root nodes might correspond to position in structure, in a depth-first traversal of a data structure, the natural order of child root nodes tends to correspond to depth in structure. To avoid such unintended clustering of root nodes in substructures by depth, some randomization is preferably used when dividing root nodes into substructures. In some embodiments, the root nodes may be randomized using a so-called 'Gym Class Randomization' technique. That is, counting off the root nodes up to the number of substructures for the current dispersion rate. For example, for a dispersion rate of two, counting root nodes off "1, 2, 1, 2 . . . ", where "ones" go in one substructure, while "twos" go in the other substructure. It will be understood that, in other embodiments, another suitable process may be used to assign root nodes to substructures.

The structure A and the structure B include the non-transferred nodes of the data structure 200, which are associated with tree structures rooted at the nodes 3, 10 and 11, respectively. The root node 3 is directly linked to the node 1, which is a node in the chunk 508a. The root nodes 10 and 11 are both directly linked to the node 5, which is also in the chunk 508a. The root nodes 3, 10 and 11 are distributed between the two structures by assigning the nodes 3 and 10 to the structure A (FIG. 8A) and the node 11 to the structure B (FIG. 8B). As may be seen in the figures, the two structures are independent and may be split into chunks in parallel, without interaction between the splitting processes.

The transfer splitter 704a generates the chunk 714 from the structure B by selecting the three nodes in the structure B. When the three nodes in the structure B have been added to the chunk 714, the structure B has been fully traversed and the transfer splitter 704a sends the chunk 714 to a second instantiation of the transfer engine 710 for transfer to the destination and then terminates.

In parallel with the generation of the chunk 714 by the transfer splitter 704a, the transfer splitter 704b generates the chunk 716 by selecting the nodes 10, 21 and 22, then selecting the nodes 3, 6, 12, 24, 25, 13 and 26, before reaching the maximum chunk size of 10. The completed chunk 716 is then sent to a third instantiation of the transfer engine 710.

After generation of the chunk 716, however, traversal of the structure A has not been completed, so the non-transferred nodes of the structure A (in this case, the nodes of the data structure A that are not in the chunk 716) are divided into two substructures (structure C and structure D, to be explained in greater detail below with reference to FIGS. 8C and 8D) for further traversal. The transfer splitter 704b invokes a transfer splitter 704c with the structure D. The transfer splitter 704b continues its own processing with the structure C. As with the transfer splitters 704a and 704b, the transfer splitters 704b and 704c process their individual structures concurrently, or in parallel, and independently of each other.

The structure C and the structure D include the non-transferred nodes of the structure A, which are rooted at the nodes 7 and 27. The root nodes are distributed between the two structures, with the node 7 being assigned to the structure C and the node 27 being assigned to the structure D. As may be seen in the figures, the two structures again are independent and may be split into chunks in parallel, without interaction between the splitting processes.

Transfer splitter 704b, after generating the chunk 716, has only two root nodes (7 and 27) remaining in the non-transferred nodes of the structure just traversed (structure A) and, thus, assigns one root node to each of the structure C and the structure D. The node 7 is directly linked to the node 3, which is a node in the chunk 716. The node 27 is directly linked to the node 13, which is also a node in the chunk 716. In other embodiments, more than two root nodes (non-transferred nodes directly linked to one or more nodes of the chunk 716) may remain and the transfer splitter 704b, after generating a parent transfer, would assign the three or more root nodes to the structure C and the structure D as the transfer splitter 704a did after generating the chunk 708.

The transfer splitter 704c generates the chunk 722 from the structure D. When the single node in the structure D has been selected for the chunk 722, the structure D has been fully traversed and the transfer splitter 704c sends the chunk 722 to a fourth instantiation of the transfer engine 710 for transfer to the destination and then terminates.

In parallel with the generation of the chunk 722 by the transfer splitter 704c, the transfer splitter 704b generates the chunk 720 by selecting the nodes 7, 14, 28, 29, 15, 30 and 31, at which point the structure C has been fully traversed. The completed chunk 720 is then sent to a fifth instantiation of the transfer engine 710 for transfer to the destination and the transfer splitter 704b terminates.

The data processing system 700, utilizing a dispersion rate of two, produces a less optimally sized set of payload transfers than the data processing system 500 of FIG. 5. The data processing system 700 generates two chunks of size 10 and one chunk each of sizes 7, 3 and 1, for an average payload transfer size of 6.2 objects per transfer.

However, the data processing system 700 has better parallelization behavior than the data processing system 500 of FIG. 5. Because the traversals of the structure A and the structure B are performed in parallel, and traversals of the structure C and the structure D are performed in parallel, the data processing system 700 completes traversal of the data structure 200 in the time required for three traversals—the chunk 708, the chunks 714 and 716, and the chunks 720 and 722. By comparison, the data processing system 500 of FIG. 5 requires the time of four traversals—generating the chunks 508a through 508d in sequence.

Thus, in embodiments of the disclosure, not only can the transfer of chunks by the transfer engines 710 proceed in parallel, so to can traversals of substructures of the data structure 200 by the transfer splitters 704a-704c proceed in parallel with each other. Results for a CDR of 3 are similar to those for a CDR of 2, and a CDR of 3 may be preferred for data processing systems having a greater amount of parallel computational capacity. In general, for a controlled dispersion rate of x, a time complexity for transfer of a data structure having N nodes is $O(\log_x N)$.

Figure 9:
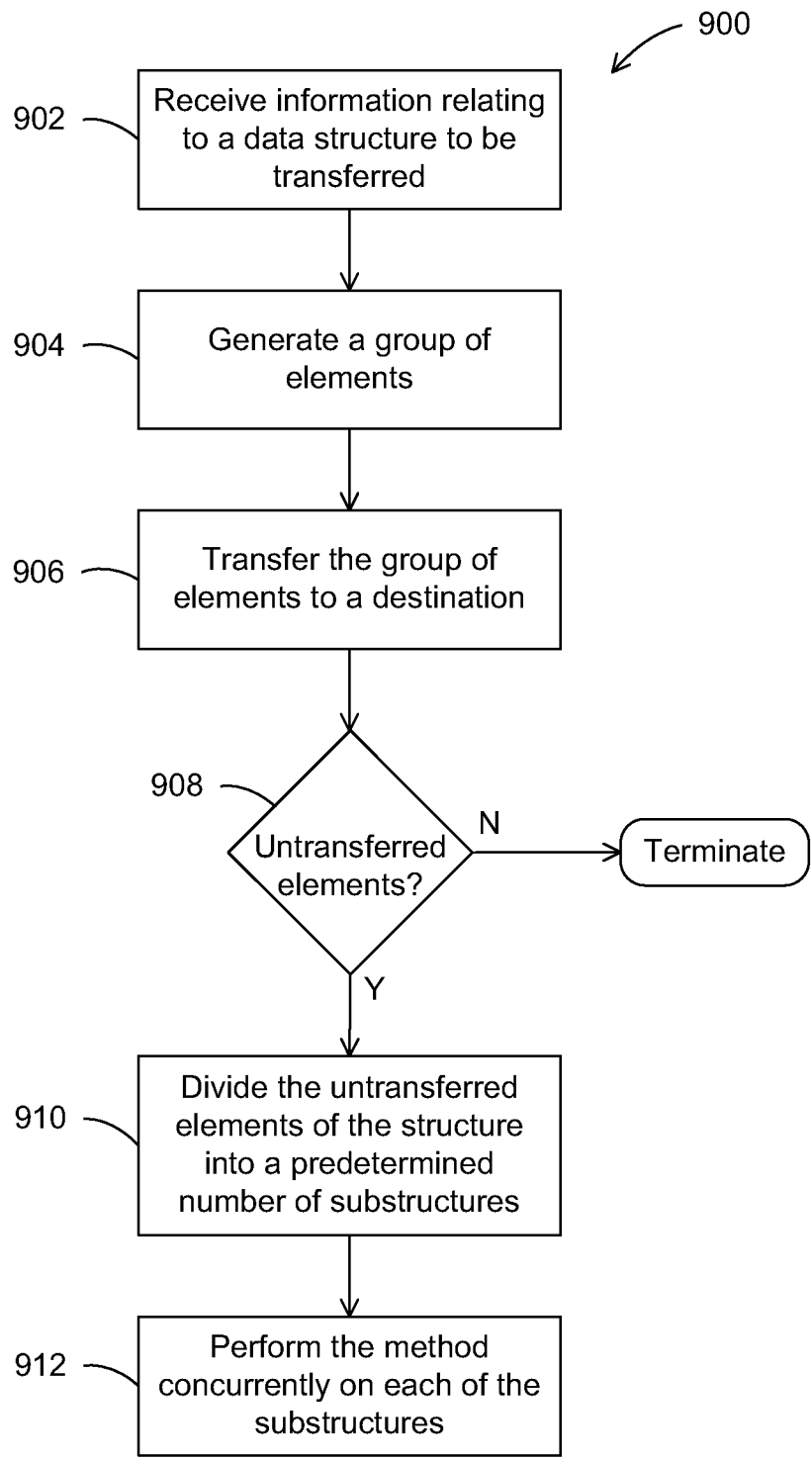
FIG. 9 depicts a process in accordance with disclosed embodiments.

FIG. 9 depicts a process 900 in accordance with disclosed embodiments. In step 902, information relating to a data structure to be transferred is received. The information may include a pointer to, or other identifier of the data structure. The information may be the data structure itself. The data structure includes a plurality of elements and may be in the format of a tree structure.

In step 904, the method generates a group (or chunk) of elements from the plurality of elements in the data structure. The group has a maximum number of elements (or chunk size). The group may include fewer than the maximum number of elements; for example, where the data structure includes fewer than the maximum number of elements, all the elements of the data structure may be assigned to the group. Where the data structure is a tree structure, the group may be generated by traversing the tree in a breadth-first or depth-first traversal.

In step 906, the group of elements generated in step 904 is transferred to a destination. A separate process may be initiated to perform the transfer of the group of elements, and the transfer may proceed in parallel with the remaining steps of the process 900.

In step 908, the process checks for remaining, non-transferred elements of the plurality of elements in the data structure. If no non-transferred elements remain, the method 900 terminates. If non-transferred elements remain, the process 900 continues in step 910.

In step 910, the remaining, non-transferred elements of the plurality of elements in the data structure are divided by assigning them to a predetermined number of substructures. The number of substructures may be referred to as a dispersion ratio of the process 900.

Where the data structure is a tree structure, the non-transferred elements may be grouped in separate tree structures, each with a root node. For such data structures, assigning the non-transferred elements to substructures may be performed by assigning root nodes (and the nodes of their associated tree structures) to the substructures. Such substructures will thus include a plurality of tree structures.

The root nodes may be assigned to groups by a randomization process or other suitable selection process. Preferably, the root nodes are substantially evenly divided among the predetermined number of substructures.

In step 912, the process 900 causes the method of the process 900 to be performed concurrently for each of the predetermined number of substructures to which elements were assigned in step 910. In some embodiments, instantiations of the process 900 are created for all but one of the predetermined number of substructures, with the associated substructure being sent to each instantiation as the structure of step 902. In such embodiments, the process 900 loops back from step 912 to step 902 to process the one remaining substructure. In other embodiments, instantiations of the process 900 are created for all of the predetermined number of substructures, the associated substructure sent to each instantiation as the structure of step 902, and the currently executing process 900 terminates after step 912. Preferably, all instantiations of the process 900 operate concurrently—that is, in parallel with each other—and independently—that is, without further interaction with each other.

Where a substructure that is sent to an instance of the process 900 includes a plurality of tree structures, the generation of a group of elements in step 904 may include traversing one or more of the plurality of tree structures in the substructure. In such circumstances, when the predetermined maximum number of elements in a group is reached, one of the plurality of tree structures may have been incompletely traversed and one or more of the plurality of tree structures may not have been traversed at all. In such circumstances, the incompletely traversed tree structure and the untraversed tree structures form separate tree structures, each with a root node, that are divided among a further predetermined number of substructures in step 910.

Following is pseudo-code of a process that can be used for generating a fixed number of sub-transfers in accordance with some embodiments. Such code may be used in step 910 to divide the non-transferred elements of the data structure into a predetermined number of substructures. This code produces a randomized, balanced set of sub-transfers of size 'DispersionRate':

```
Transfer[ ] children = generateChildTransfers(Integer
DispersionRate, Object[ ] childTransferRootObjects) {
    Object[ ] randomOrderChildren =
    randomize(childTransferRootObjects);
    Transfer[DispersionRate] results = new
    Transfer[DispersionRate]( );
    For (int i =0; i< randomOrderChildren.size( ); i++) {
        results[(i mod
        DispersionRate)].addRootNode(randomOrderChildren[i]);
    }
    results = results.removeEmpty( );
    Return results;
}
```

The exemplary pseudo-code shows one sample process that can be used for assigning root nodes to substructures as described herein. The substructures identified by the splitter are traversed in parallel by methods according to the disclosure.

Those skilled in the art will recognize that, for simplicity and clarity, the full structure and operation of all data processing systems suitable for use with the present disclosure is not being depicted or described herein. Instead, only so much of a data processing, system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of a instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for data transfer in a data processing system, comprising:
   receiving by the data processing system information relating to a data structure to be transferred, wherein the data structure comprises a tree structure and includes a plurality of elements where each element is a node in the tree structure and is linked to at least one other element;
   selecting by the data processing system a group of elements from the plurality of elements, the group including at most a predetermined maximum number of elements, the unselected elements in the plurality of elements being remaining elements which are associated with a plurality of root nodes, and wherein the group of elements is selected by one of a breadth-first and a depth-first traversal of the tree structure;
   transferring by the data processing system the group of elements to a destination;
   assigning, by the data processing system, the remaining elements to a predetermined number of substructures, including assigning the plurality of root nodes to the substructures, wherein the predetermined number of substructures correspond to a dispersion rate, wherein the predetermined number of substructures comprising the remaining elements are not limited by the predetermined maximum number of elements in the group of elements, and wherein at least one substructure is assigned at least two elements directly linked to one or more elements in the group of elements; and
   recursively performing the steps of selecting, transferring and assigning concurrently on each of the predetermined number of substructures until all elements have been transferred, wherein the substructures are transferred in a number of parallel transfer processes corresponding to the dispersion rate.

2. The method of claim 1, wherein the plurality of root nodes are randomly assigned to the predetermined number of substructures.

3. The method of claim 1, wherein:
   the data structure comprises a plurality of tree structures; and
   selecting a group of elements from the plurality of elements comprises traversing more than one of the plurality of tree structures.

4. The method of claim 1, wherein:
   the predetermined number of substructures includes a first substructure and a second substructure; and
   performing the method concurrently on each of the substructures comprises performing the method independently on the first substructure and on the second substructure.

5. The method of claim 1, wherein the group of elements includes all the elements of the data structure.

6. A data processing system comprising a plurality of processors and an accessible memory, the data processing system particularly configured to perform the steps of:
   receiving information relating to a data structure to be transferred, wherein the data structure comprises a tree structure and includes a plurality of elements where each element is a node of the tree structure and is linked to at least one other element;
   selecting a group of elements from the plurality of elements, the group including at most a predetermined maximum number of elements, the unselected elements in the plurality of elements being remaining elements which are associated with a plurality of root nodes, and wherein the group of elements is selected by one of a breadth-first and a depth-first traversal of the tree structure;
   transferring the group of elements to a destination;
   assigning the remaining elements to a predetermined number of substructures, including assigning the plurality of root nodes to the substructures, wherein the predetermined number of substructures correspond to a dispersion rate, wherein the predetermined number of substructures comprising the remaining elements are not limited by the predetermined maximum number of elements in the group of elements, and wherein at least one substructure is assigned at least two elements directly linked to one or more elements in the group of elements; and
   recursively performing the steps of selecting, transferring and assigning concurrently on each of the predetermined number of substructures until all elements have been transferred, wherein the substructures are transferred in a number of parallel transfer processes corresponding to the dispersion rate.

7. The data processing system of claim 6, wherein the plurality of root nodes are randomly assigned to the predetermined number of substructures.

8. The data processing system of claim 6, wherein:
   the data structure comprises a plurality of tree structures; and
   selecting a group of elements from the plurality of elements comprises traversing more than one of the plurality of tree structures.

9. The data processing system of claim 6, wherein:
   the predetermined number of substructures includes a first substructure and a second substructure; and
   performing the method concurrently on each of the substructures comprises performing the method independently on the first substructure and on the second substructure.

10. The data processing system of claim 6, wherein the group of elements includes all the elements of the data structure.

11. A tangible non-transitory machine-readable medium encoded with computer-executable instructions that, when executed, cause a data processing system to perform the steps of:
   receiving information relating to a data structure to be transferred, wherein the data structure comprises a tree structure and includes a plurality of elements where each element is a node of the tree structure and is linked to at least one other element;

selecting a group of elements from the plurality of elements, the group including at most a predetermined maximum number of elements;

transferring the group of elements to a destination;

assigning the elements of the plurality of elements not in the group of elements to a predetermined number of substructures, wherein the predetermined number of substructures correspond to a dispersion rate, wherein the predetermined number of substructures comprising the plurality of elements not in the group of selected elements are not limited by the predetermined maximum number of elements in the group of selected elements, and wherein at least one substructure is assigned at least two elements directly linked to one or more elements in the group of elements; and recursively performing the steps of selecting, transferring and assigning concurrently on each of the predetermined number of substructures until all elements have been transferred, wherein the substructures are transferred in a number of parallel transfer processes corresponding to the dispersion rate.

12. The non-transitory machine-readable medium of claim 11, wherein the plurality of root nodes are randomly assigned to the predetermined number of substructures.

13. The non-transitory machine-readable medium of claim 11, wherein:
   the data structure comprises a plurality of tree structures; and
   selecting a group of elements from the plurality of elements comprises traversing more than one of the plurality of tree structures.

14. The non-transitory machine-readable medium of claim 11, wherein:
   the predetermined number of substructures includes a first substructure and a second substructure; and
   performing the method concurrently on each of the substructures comprises performing the method independently on the first substructure and on the second substructure.

* * * * *